Nov. 18, 1969  G. P. DUECY  3,479,049
AXLE LOAD DISTRIBUTING AND BALANCING DEVICE
Filed Oct. 9, 1967  2 Sheets-Sheet 1
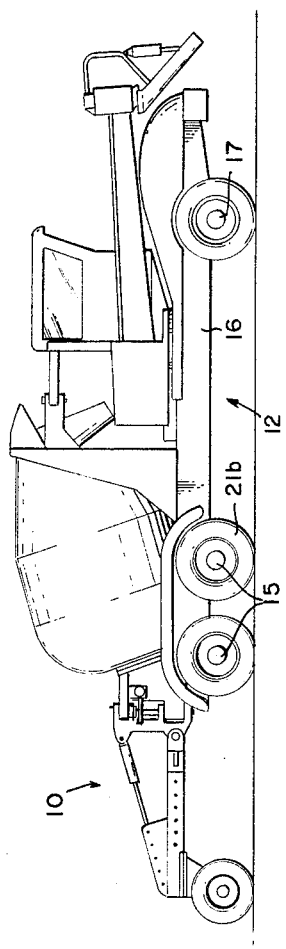
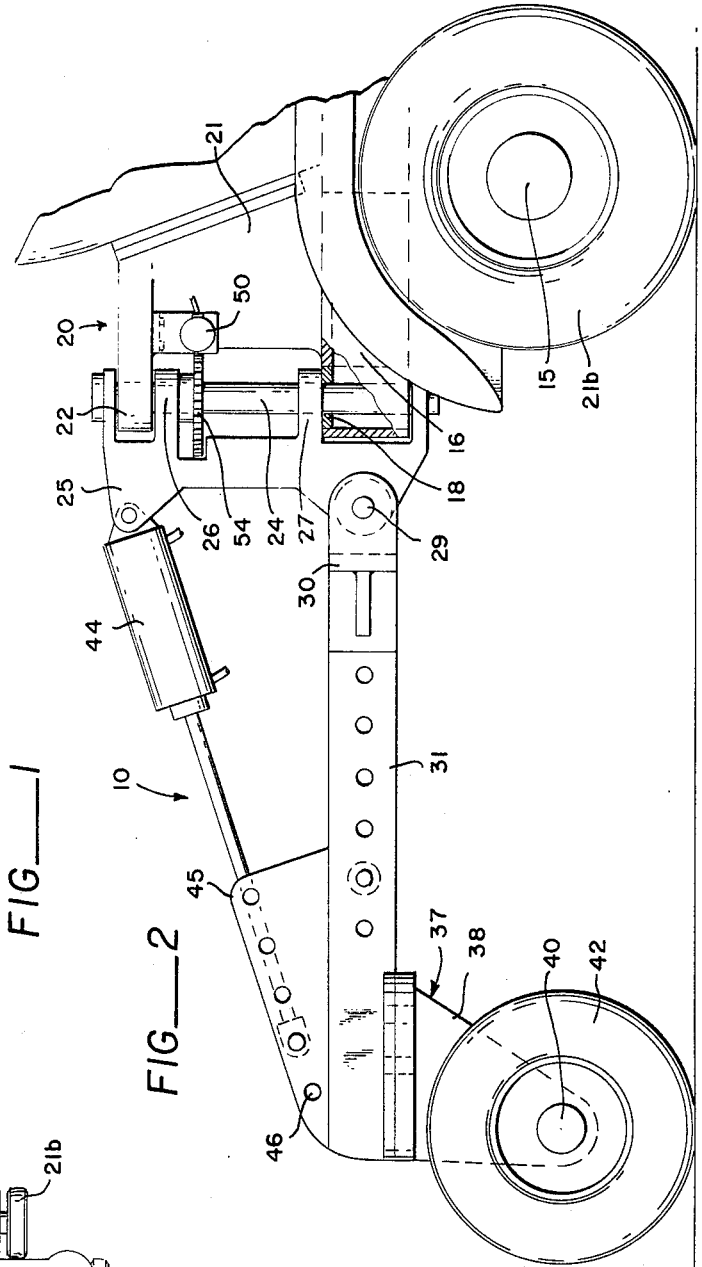
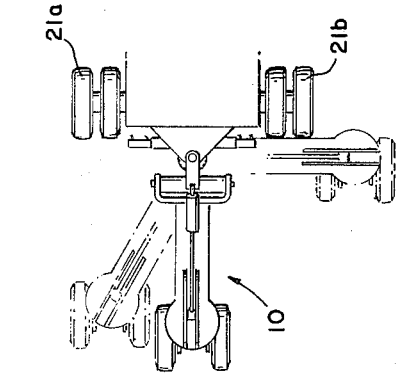
INVENTOR.
GEORGE P. DUECY
BY
*Fraybeal, Cole & Barnard*
ATTORNEYS Nov. 18, 1969   G. P. DUECY   3,479,049
AXLE LOAD DISTRIBUTING AND BALANCING DEVICE
Filed Oct. 9, 1967   2 Sheets-Sheet 2
FIG__4
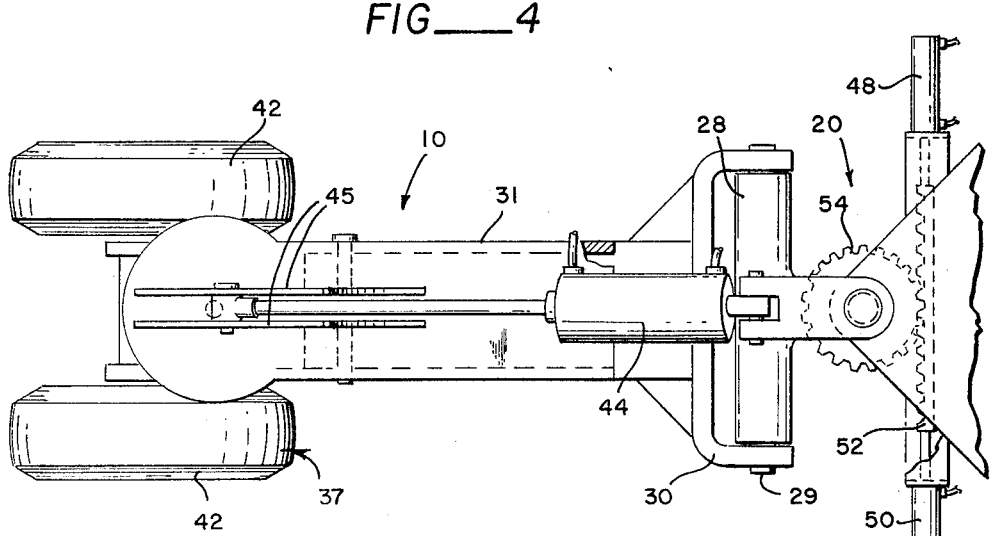
FIG__5
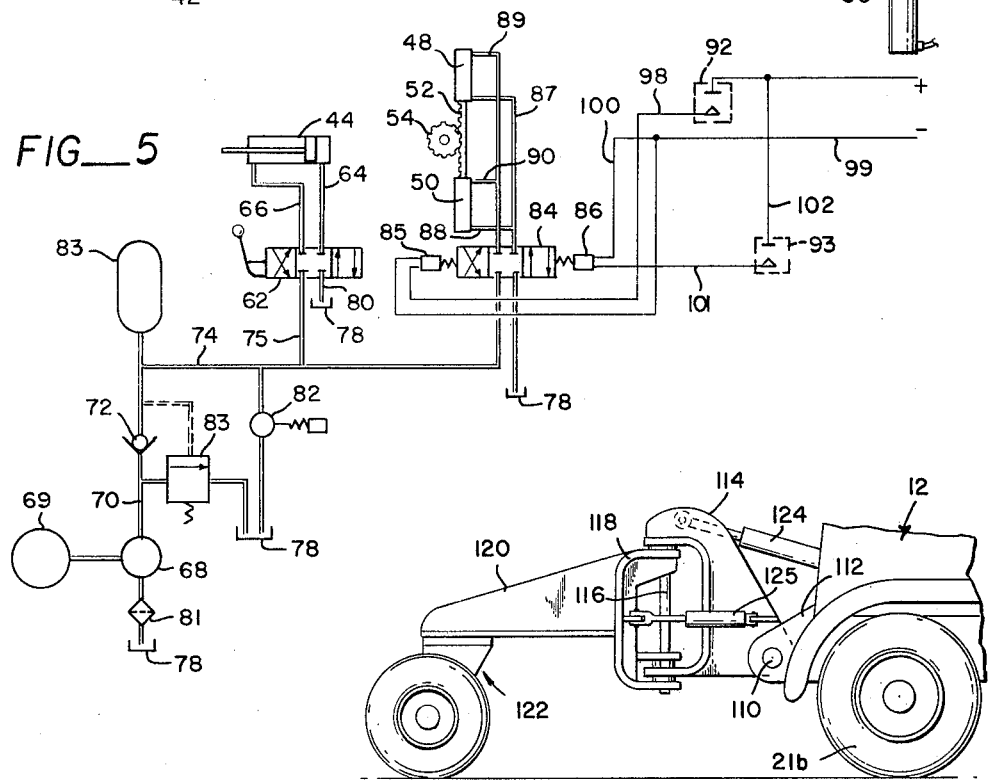
FIG__6
INVENTOR.
GEORGE P. DUECY
BY
*Graybeal, Cole & Barnard*
ATTORNEYS United States Patent Office 3,479,049
Patented Nov. 18, 1969

3,479,049
AXLE LOAD DISTRIBUTING AND
BALANCING DEVICE
George P. Duecy, 6300 Glenwood Ave.,
Everett, Wash. 98201
Filed Oct. 9, 1967, Ser. No. 673,896
Int. Cl. B62d 61/12, 53/02; B62b 1/08
U.S. Cl. 280—81                                        7 Claims

ABSTRACT OF THE DISCLOSURE

Axle load distributing and load balancing apparatus which is attached to and towed by heavy mobile equipment. The load balancing and distributing apparatus has a castered wheel assembly at its rear end mounted for free rotational movement. The apparatus is designed for both horizontal and vertical pivotal movement at its forward end where it is attached to the rear end of the towing or main vehicle. The connection at the forward end of the apparatus is in the nature of a universal joint. Actuator means are provided for swinging the apparatus down about its horizontal pivot to shift weight not only to the castered wheels but to distribute a portion of the vehicle load from the rear to the front of the main vehicle. Additionally, actuator means are provided for swinging the apparatus about its vertical axis to provide for load balancing. Movement of the apparatus about a vertical axis, which in effect swings the outer end having the castered wheel to one side or the other, is made in response to load sensor means located between the main vehicle frame and its rear axle. If the load carried by the main vehicle has a shift in its center of gravity toward one side or the other, then the sensor means will actuate the horizontal pivoting actuator and swing or pivot the apparatus to that side of the vehicle to which there has been a shift in the load center of gravity. Additionally, the load distributor may be pivoted outwardly to act as an outrigger for providing additional support to the main vehicle when in a stationary position.

BACKGROUND OF THE INVENTION

The present invention relates generally to the art of axle load distribution for heavy mobile equipment and motor vehicles such as motor cranes, concrete transporting and placing trucks, and other heavy cargo-carrying vehicles. Among the known prior art relating to this invention is United States Patent No. 3,298,706 directed to a towed vehicle for distributing axle loading. In the patent a cantilever member is attached to the main vehicle for movement about a vertical axis. At the rear end of the load distributing device is an axle having double dual wheels. The axle load distributing device is towed in the manner of a trailer and means are provided for transferring part of the load to the towed axle. No means is provided for pivoting the axle load distributing device horizontally in response to lateral load shifting in the main vehicle.

Other references which are of interest as relating to axle load distribution are United States Patents Nos. 3,019,002, 3,112,100, Re. 25,617, and 3,191,961. None of the above-mentioned patents, however including U.S. Patent No. 3,298,706, either singly or in combination, relates to the unique functional and structural features of the instant device.

It is quite clear from a study of the prior art that the need for a device to assist in and increase the load carrying capacity of a vehicle is well-known. Heretofore known axle load distributing devices have merely functioned to distribute load longitudinally of the main and towed vehicles. The application of force to the towed vehicle has the effect of lifting a portion of the load on the main vehicle from the driving axle or axles and increasing the load on its front or steering axle. Part of the load, of course, is taken by the axle of the towed vehicle also. The application of such force to the towed vehicle is usually performed by hydraulic or pneumatic means. The force applied must be controlled as it is possible to lift the driving axle or axles of the main vehicle from the roadway if sufficient force is applied. Such force could, of course, overload the front or steering axle if applied in excess of a designed allowable limit. Those skilled in the art are aware of the factors which are to be considered in calculating such allowable loading limitations.

If it is desired to achieve maximum loading of an axle or group of axles in a vehicular system, provision must be made for a change in the location of the load center of gravity. There are times when due to sloping roadways or centrifugal forces acting on a load with a high center of gravity, that an ordinary load distributing device will not balance the load but will contribute to an overturning moment in the main vehicle because of the application of a constant upward force on the center rear of the main vehicle. Thus, it will be understood that if the vehicle travels on a sloping roadway around a curve the center of gravity of the load being somewhat high will shift to the lower side of the vehicle, i.e. to the left or right of the vertical centerline of the vehicle. Since the load distributor is, in effect, applying upward force on the center rear of the main vehicle frame, the tendency is to aggravate or accentuate the shift in the center of gravity. Hence, it will be appreciated that a shift may be of some magnitude as to overturn the loaded main vehicle.

SUMMARY OF THE INVENTION

The invention provides an axle load distributing and load balancing device which is able to pivot up and down about a generally horizontal axis to provide longitudinal load distribution on the axles of the vehicle system and also to pivot from side to side laterally about a generally vertical axis so that lateral shifts in the load center of gravity are also balanced or compensated for. In balancing the load, a load distributing device is moved sideways in response to sensor means on the main vehicle which detect the lateral shifts in the load center of gravity. Additionally the load distributing device acts as an outrigger for providing supplementary support for the load when the main vehicle is stationary.

To balance load center of gravity shifts, sensors are located to detect any change between the normal or centered load position of the vehicle frame with respect to the rear axle of the main vehicle. A sensor will be located on each side of the vehicle frame. Lateral movement of the load center of gravity in the vehicle will result in the compression of the more heavily loaded springs supporting the frame on the vehicle axles. This compression will, of course, change the relationship between the axles and the frame on either side of the vehicle and will energize the sensor to actuate the steering system of the load distributing device in the direction of movement of the load center of gravity. The load equalizer will then produce a balancing moment to counteract the overturning force on the vehicle instead of assisting in overturning movement as is the case in conventional axle loading devices.

It is therefore among the many features of this invention to provide a load equalizing apparatus which can be readily attached to and detached from the rear portion of a main or towing vehicle. It is another feature of this invention to supply an improved load equalizing apparatus which is able to assume a predetermined and adjustable percentage of the main vehicle load as well as transfer some of such load from the rear axle or axles to the front axle of the main vehicle. A further feature is to furnish a load equalizing device which is able to counter the effect of overturning movements by moving horizontally toward that side of the main vehicle to which there has been a shift in the load center of gravity. A still further feature is to provide an outrigger for additionally supporting the load when the vehicle is stationary.

BRIEF DESCRIPTION OF THE DRAWINGS

FIG. 1 is a side elevation view showing a main load-carrying vehicle and the towed load distributing and balancing device of this invention;

FIG. 2 is a partial side elevational view of the device enlarged to show more detail thereof;

FIG. 3 is a schematic plan view of the load device indicating in phantom lines various positions of the load distributing and equalizing device as it is pivoted to either side of the vehicle for the purpose of stabilizing lateral load shifts or for acting as a stationary outrigger;

FIG. 4 is an enlarged plan of the load distributing and balancing device;

FIG. 5 is a combination electrical-hydraulic schematic control diagram for movement of the load distributing and balancing device; and FIG. 6 is a side elevation of an alternative form of the load distributing and balancing device.

DESCRIPTION OF PREFERRED EMBODIMENTS

Referring now to the drawings, it will be seen that the load distributing and balancing device, hereinafter referred to for brevity as a load distributing device, generally described by the number 10, is attached to the rear of a main or towing vehicle 12 having a load thereon. The main vehicle in this case is a cement mixer and transporter truck, the chassis of which has a longitudinal lefthand side frame member, not shown, and a righthand side frame member 16. The lefthand and righthand designations are with respect to the main vehicle as viewed from the rear.) The side frame members are connected to the rear of the main vehicle by a cross-frame member 18. The chassis is supported on the main vehicle rear axles 15 and front axle 17 by conventional springs, not shown. The rear axles are supported on left and righthand wheels 21a and 21b (FIG. 3), respectively.

The load distributing device 10 includes a connector portion generally designated by the number 20 which, as can be seen in FIG. 2, has a frame bracket 21 that is detachably connected or otherwise fastened to the main vehicle body such as crossframe member 18. The frame bracket has an upper leg portion 22 which has an aperture aligned with a lower aperture in the crossframe member to receive a vertical pivot pin 24. The vertical pivot pin provides for horizontal pivotal movement of the load distributing device with respect to the main vehicle.

The connector portion 21 is also provided with a pivot bracket 25 that includes upper and lower sets of bearing arms 26 and 27, respectively. Each set of bearing arms is provided with an aligned aperture that receives the pivot pin 24. The bearing arms serve to provide bearing surfaces for horizontal pivoting of the load distributing device 10, as well as connect it to the main vehicle.

The connector portion 20 also provides for pivotal movement of the load distributing device 10 in a vertical plane and for this purpose the pivot bracket 25 includes at its lower end a laterally extending cylindrical spacer 28 (FIG. 4). The spacer is bored to receive a horizontal pivot pin 29.

Connected by the pivot pin 29 to the connector portion 20 is a generally C-shaped bracket 30 formed integrally with a rear body member 31. The rear body member is supported by a castered wheel assembly 37. The castered wheel assembly includes a swivel wheel mount 38 which extends generally downwardly and supports an axle 40 (FIG. 2). The axle in turn has mounted thereon dual ground-engaging wheels 42. The rear body member is formed of a conventional telescoping frame that allows for lengthwise adjustment. In other words, the castered wheel assembly may be moved toward or away from the main vehicle. This adjustability allows the castered wheel assembly to be within the permissible vehicle width restrictions when being towed as a load distributor and also allows for extending beyond the vehicle width for use as an outrigger.

A vertical load distributing actuator 44 is connected at its lower end by a suitable pivot pin to two spaced vertical plates 45 formed on the rear body member 31. The plates have a plurality of apertures 46 for changing the location of the pin connection. The actuator is pivotally fastened at its upper end by a suitable pivot pin to the pivot bracket 25.

Left and righthand actuators 48 and 50, respectively, are fastened to the frame bracket 21 by any suitable means and provide for pivoting the castered wheel assembly 37 in a plane normally horizontal or parallel to the plane of the crossframe member 18. All of the foregoing actuators are of a conventional type having a cylinder, piston and connecting rod, and may be either hydraulically or pneumatically operated. For the purpose of this description the preferred form will be described for a hydraulic system.

As best shown in FIG. 4, the actuators 48 and 50 are connected to a rack 52 that is meshed with a pinion 54. The pinion is rigidly fastened by suitable means to the underside of the upper set of bearing arms 26 of the pivot brackets 25. Consequently, reciprocation of the rack will cause rotation of the castered wheel assembly 37 about the pivot pin 24.

FIG. 5 shows an electrical-hydraulic diagram for control of the load distributing device. The load distributor actuator 44 is controlled by a manually operated bidirectional valve 62 which permits hydraulic fluid under pressure to be directed to either end of the actuator by lines 64 and 66. Pressurized fluid is supplied by a pump 68, driven by a motor 69, through a line 70, a check valve 72 and lines 74 and 75. The fluid is returned from the actuator through the valve 62 to a reservoir 78 via return line 80. A suitable strainer 81, a solenoid operated relief valve 82, and an accumulator 83 are also provided as is conventional.

The left and righthand actuators 48 and 50 are controlled by a bidirectional valve 84 that is operated by solenoids 85 and 86. As can be readily seen in FIG. 5, in one position of the valve, for example, to the right, pressurized fluid is supplied simultaneously to the outer end of actuator 50 and to the inner end of the actuator 48 via line 74 and lines 87 and 88. The fluid is returned from the opposite ends of the actuators via lines 89 and 90 and return line 80. When the valve is in the above position the pinion 54 will be rotated counter-clockwise, as viewed in FIG. 5, and the castered wheel assembly 37 will be swung outward to the righthand side of the main vehicle. When the valve is reversed the castered wheel assembly will be swung back to center or toward the lefthand side of the main vehicle.

The left and righthand actuators 48 and 54 are responsive to sensor means either pneumatic, hydraulic, mechanical, or, as shown, electrical limit switches, located on the frame of the main vehicle 12. As still another alternative, the actuators could also be controlled manually by the vehicle operator. Limit switches (FIG. 5) 92 and 93 are positioned on the frame of each side of the main vehicle to detect relative movement between the vehicle axle or axles and the side frame members. Switch 92 is adjacent the left rear wheels 21a of the vehicle, whereas switch 93 is adjacent the right rear wheels 21b. If there is a lateral load shift on the main vehicle, the tendency is to tilt that side of the vehicle downwardly, in other words moving the frame down with respect to the wheels. The switches are installed so that a predetermined amount of movement on either side of the frame closes a switch thus actuating one of the solenoids 85 or 86 which in turn operates the valve 84. Switch 92 is connected in the circuit to solenoid 85 by conductors 98 and 99 whereas switch 93 is connected to solenoids 86 by conductors 100, 101, 102 and 99.

As an example, if switch 92 is closed due to a load shift of a predetermined magnitude to the left side, resulting in a predetermined amount of movement of the frame relative to the axle, then the switch will be closed completing the circuit to solenoid 85. Energization of solenoid 85 will result in movement of valve 84 to the left, as viewed in FIG. 5, so that the pinion 54 is rotated clockwise to swing the castered wheel assembly to the left or heavier side of the vehicle. Thus, as can be readily seen, the overturning moment generated by the load shift on the main vehicle is counteracted by movement of the load distributing device to that side.

The load distributing device may also be used as a stabilizing mechanism or outrigger. Those skilled in the art are aware of hydraulic or pneumatic cylinders used as outriggers in modern day heavy equipment. Normally the cylinder is pointed downwardly and the piston rod extending therefrom has a pad at the end. When the equipment is to be used, the piston rod and pad are extended to engage the ground beyond the width of the vehicle and thereby stabilize the vehicle while it is working. The instant load distributing device may be swung to one side or the other to add stability in the same sense that outrigger cylinders contribute to stabilization of the main vehicle.

The modification shown in FIG. 6 is basically similar to the preferred embodiment with the exception that the horizontal pivot axis is forward of the vertical pivot axis which is the reverse of the pivot axes locations in the preferred embodiment. Structural modifications and circuit changes to accomplish the above axes locations are well within the skill of the art; therefore the modification shown in FIG. 6 will be only generally described.

A horizontal pivot shaft 110 is received in apertured ears 112, only one shown, that are secured to opposite sides of the frame at the rear of the main vehicle 12. A connector 114 is secured to the horizontal pivot shaft and receives a vertical pivot shaft 116. The vertical pivot shaft is connected to a bearing bracket 118 which is formed integrally with a body member 120. The body member is, in turn, supported by a castered wheel assembly 122 identical to that of the preferred embodiment. An actuator 124 performs the same function as the load distributing actuator 44 of the preferred embodiment by applying the desired force to distribute the load among the various vehicle axes. An actuator 125 performs the function of the left and righthand actuators 48 and 50 of the preferred embodiment by swinging the castered wheel assembly about the pivot pin 116.

Although the invention has been described in its preferred forms, it is understood that changes in the details may be made without departing from the principles of the invention.

What is claimed is:
1. Apparatus for longitudinal and lateral load distribution and equalization for heavy mobile equipment, comprising:
   (a) a main vehicle;
   (b) an auxiliary vehicle;
   (c) connecting means between said main and auxiliary vehicles having pivot means permitting both horizontal and vertical movement of said auxiliary vehicle relative to said main vehicle;
   (d) actuator means interconnecting said main and auxiliary vehicles for causing both horizontal and vertical movement of said auxiliary vehicle relative to said main vehicle, and
   (e) load shift sensing means on said main vehicle responsive to weight shifts in said main vehicle and operatively connected to said actuator means for causing horizontal movement of said auxiliary vehicle to compensate for said weight shifts.

2. The apparatus of claim 1 wherein said actuator means includes a first actuator for applying a constant upward force on the rear of said main behicle, and a second actuator for applying a force on said auxiliary vehicle for moving it to either side of said main vehicle.

3. The apparatus of claim 1 and wherein said connecting means has the horizontal pivot means located rearwardly of said vertical pivot means.

4. The apparatus of claim 1 and wherein said connecting means has the vertical pivot means located rearwardly of said horizontal pivot means.

5. Apparatus for longitudinal and lateral load distribution and equalization for heavy mobile equipment, comprising:
   (a) a primary vehicle;
   (b) a towed vehicle having a forward end for attachment to said main vehicle and a rear end fitted with ground-engaging wheel means thus providing at least one additional axle for increased loading of said main vehicle, said towed vehicle including connecting means for interconnecting said main and towed vehicles and permitting generally lateral horizontal and vertical movement of said towed vehicle relative to said main vehicle;
   (c) first actuator means for moing said towed vehicle generally vertically with respect to said main vehicle to thereby transfer and distribute a portion of the load from said main vehicle to said towed vehicle;
   (d) second actuator means for moving said towed vehicle in generally lateral horizontal movement in response to lateral load shifts in said main vehicle; and
   (e) load shift sensing means on said main vehicle responsive to weight shifts in said main vehicle and operatively connected to said actuator means for causing horizontal movement of said auxiliary vehicle to compensate for said weight shifts.

6. The apparatus of claim 5 and wherein said connecting means has the horizontal pivot means located rearwardly of said vertical pivot means.

7. The apparatus of claim 5 and wherein said connecting means has the vertical pivot means located rearwardly of said horizontal pivot means.

References Cited

UNITED STATES PATENTS

| Re. 24,895 | 11/1960 | Clements | 280—6 X |
| 2,360,902 | 10/1944 | Simmons | 280—406 |
| 2,974,976 | 3/1961 | Lyall | 280—43.23 X |
| 3,000,122 | 9/1961 | Gurries et al. | 172—291 |
| 3,077,338 | 2/1963 | Bergerson et al. | |
| 3,112,100 | 11/1963 | Prichard. | |
| 3,240,477 | 3/1966 | Brennan et al. | 280—405 X |
| 3,298,706 | 1/1967 | Lyall | 280—81 |

KENNETH H. BETTS, Primary Examiner

U.S. Cl. X.R.

180—104; 280—43.23, 406